(12) United States Patent
Sato et al.

(10) Patent No.: US 7,522,222 B2
(45) Date of Patent: Apr. 21, 2009

(54) RECORDING AND REPRODUCING APPARATUS, CONTROL METHOD THEREOF, AND REMOTE CONTROL DEVICE

(75) Inventors: Shojiro Sato, Kawasaki (JP); Yuji Ito, Osato-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 704 days.

(21) Appl. No.: 11/138,915

(22) Filed: May 27, 2005

(65) Prior Publication Data

US 2005/0265691 A1    Dec. 1, 2005

(30) Foreign Application Priority Data

May 31, 2004  (JP) .............................. 2004-161755

(51) Int. Cl.
  H04N 5/44  (2006.01)
  G06F 3/02  (2006.01)
(52) U.S. Cl. ...................... 348/734; 341/176; 345/169
(58) Field of Classification Search ................. 341/176; 345/169; 348/734
See application file for complete search history.

(56) References Cited

U.S. PATENT DOCUMENTS 4,644,349 A * 2/1987 Fujita et al. ............ 340/825.25
4,856,081 A * 8/1989 Smith ....................... 455/151.4
6,107,992 A * 8/2000 Ishigaki ....................... 345/158
6,507,306 B1 * 1/2003 Griesau et al. .............. 341/176
6,690,314 B2 * 2/2004 Fujii .......................... 341/176
7,109,908 B2 * 9/2006 Griesau et al. .............. 341/176
2004/0227857 A1 * 11/2004 Mizushima et al. ......... 348/552

FOREIGN PATENT DOCUMENTS

JP    6-311563    11/1994

* cited by examiner

*Primary Examiner*—Thai Tran
*Assistant Examiner*—Mishawn Dunn
(74) *Attorney, Agent, or Firm*—Pillsbury Winthrop Shaw Pittman, LLP

(57) ABSTRACT

The present invention provides a remote control device having a dedicated key only used in a first mode, a dual purpose key that is used in the first mode and a second mode, a change key for changing a control mode from the first mode to the second mode, a light emitting section for emitting a light of a code in response to pressing of the dedicated key or the dual purpose key, and a control section for controlling the light emitting section so as to transmit a key code of a pressed key code and a continuous code meaning continuous pressing when the dedicated key or the dual purpose key is continuously pressed in the first mode and transmit only the key code of the dedicated key when the dedicated key is continuously pressed in the second mode.

19 Claims, 7 Drawing Sheets

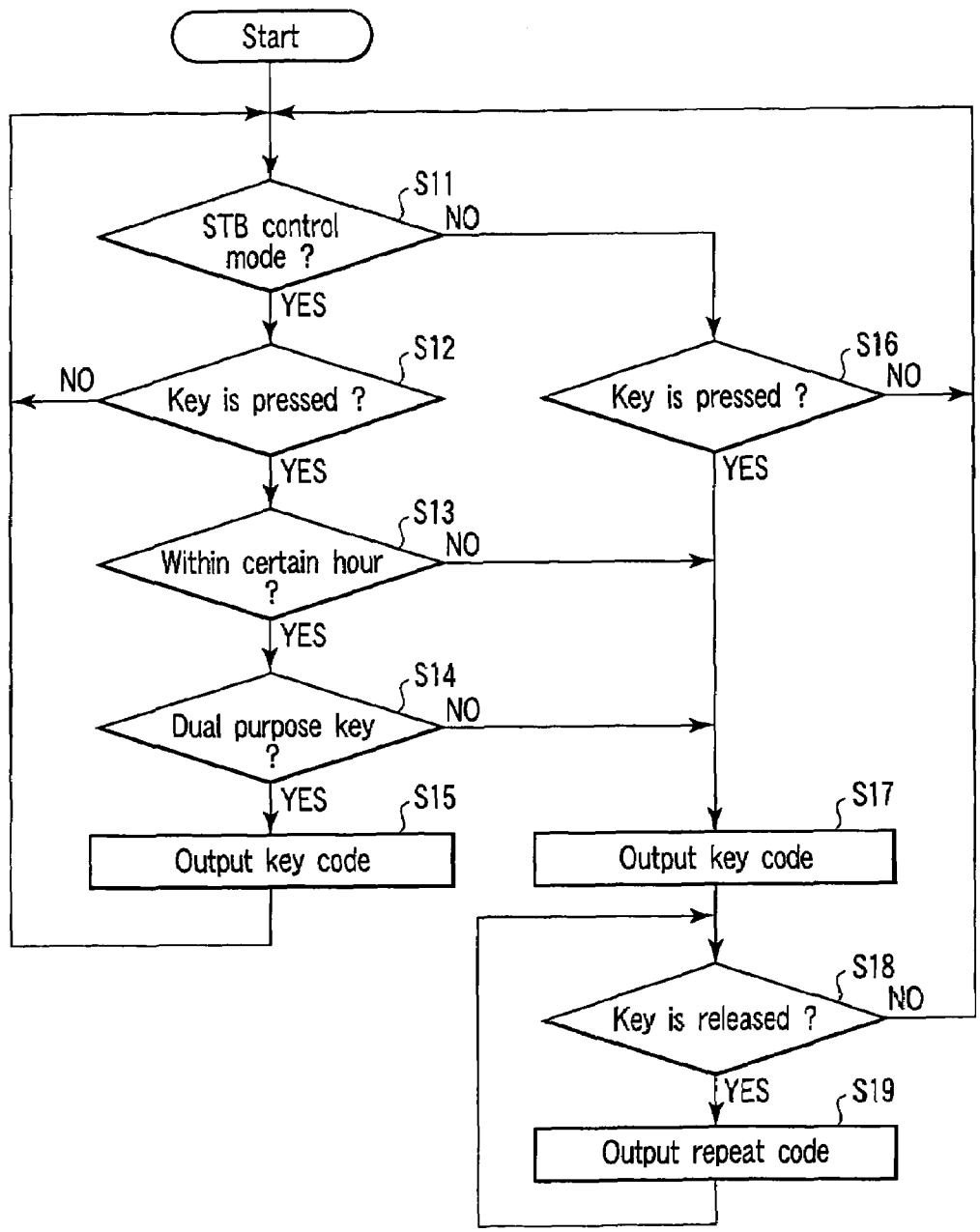
F I G. 4

(A) : Emit light of data of "STB control" key
(D) : Emit light of continuous code

RECORDING AND REPRODUCING APPARATUS, CONTROL METHOD THEREOF, AND REMOTE CONTROL DEVICE

CROSS-REFERENCE TO RELATED APPLICATIONS

This application is based upon and claims the benefit of priority from prior Japanese Patent Application No. 2004-161755, filed May 31, 2004, the entire contents of which are incorporated herein by reference.

BACKGROUND OF THE INVENTION

1. Field of the Invention

The present invention relates to a recording and reproducing apparatus, and particularly, the present invention relates to a recording and reproducing apparatus, in which one remote controller controlles both of the recording and reproducing apparatus and a set top box to be controlled by this recording and reproducing apparatus, a control method thereof, and a remote control device.

2. Description of the Related Art

In recent years, an optical disk apparatus of a DVD (Digital Versatile Disk) and a harddisk recorder or the like have been widely used, however, the operations of these recording and reproducing apparatuses can be carried out not only by an operational switch of the apparatus but also by a remote control device supplied with the apparatus. In this case, a technology that the single remote control device controls not only a main body of the recording and reproducing apparatus but also an additional tuner, namely, a peripheral device such as a set top box or the like has been known.

Jpn. Pat. Appln. KOKAI Publication No. 6-311563 discloses a technology for evading interference of an operational signal into both of the main body and the peripheral device such as a VTR or the like by the single remote controller upon transmission of the operational signal to both of the main body and the peripheral device. In this case, when the remote control device transmits a signal to the main body of the VTR, the main body of the VTR transmits a transmission inhibit signal in order to inhibit transmission of an instruction signal from the remote control device to the peripheral device. Thereby, interference of the transmission signal from the remote controller to the main body of the VTR and the transmission signal from the main body of the VTR to the peripheral device (a CATV terminal device) are prevented.

However, according to the above-described prior art, in the remote control device, a key dedicated for the VTR apparatus and a key dedicated for the CATV terminal device as the peripheral device (the set top box) are provided respectively. As a result, a problem arises such that the apparatus cannot be made compact because the number of the operational key is increased.

In addition, there is another problem as follows. When controlling two apparatuses, namely, the main body of the recording and reproducing apparatus and the peripheral device to be controlled by an IR bluster from the main body of the recording and reproducing apparatus by one remote control device while continuously pressing one operational key of the remote control device, an optical signal including an instruction code is supplied from the remote control device to the recording and reproducing apparatus and the optical signal including the instruction code is supplied from the IR bluster of the recording and reproducing apparatus to a receiving unit of the peripharal device with delay. In this case, the optical signal from the remote control device and the optical signal from the IR bluster interferes each other at slightly deviated timing. And as a result, a problem arises such that the optical signal is saturated at the receiving unit of the peripharal device and the receiving unit of the peripharal device cannot receive the optical signal from the IR bluster certainly to cause false operation. It can be said that this problem is based on continuous radiation of a code in response to the key operation and an optical signal including continuous codes after the code from the remote control device when continuously pressing the key of the remote controller.

BRIEF SUMMARY OF THE INVENTION

According to one aspect of the present invention, there is provided a recording and reproducing apparatus, comprises a remote control section having a dedicated key only used in a first mode for the operation of a main body, a dual purpose key used in a second mode for the operation of an outer apparatus and the first mode, a change key which changes a control mode from the first mode to the second mode, a first light emitting section which transmits a code signal in response to the key operation as radiant light, and a control section which controls the light emitting section to transmit a key code of a pressed key and a continuous code meaning continuous pressing when the dedicated key or the dual purpose key is continuously pressed in the first mode and to transmit only the key code of the dedicated key when the dedicated key is continuously pressed in the second mode; a recording and reproducing unit which records and reproduces the information; a second light emitting unit which transmits a code signal to the outer apparatus as radiant light; and a main control section which controls the recording and reproducing unit to perform the recording and reproducing processing in response to a received code signal when the code signal is received from the first light emitting section of the remote control section and the first mode is selected based on the received code signal and to supply a predetermined signal to the outer apparatus via the second light emitting unit in response to the code signal from the first light emitting section when the second mode is selected.

BRIEF DESCRIPTION OF THE SEVERAL VIEWS OF THE DRAWING

FIG. 4 is a flow chart showing an example of transmission processing of the remote control device according to the embodiment of the present invention;

DETAILED DESCRIPTION OF THE INVENTION

With reference to the drawings, the preferred embodiments of the present invention will be described below.

Figure 1:
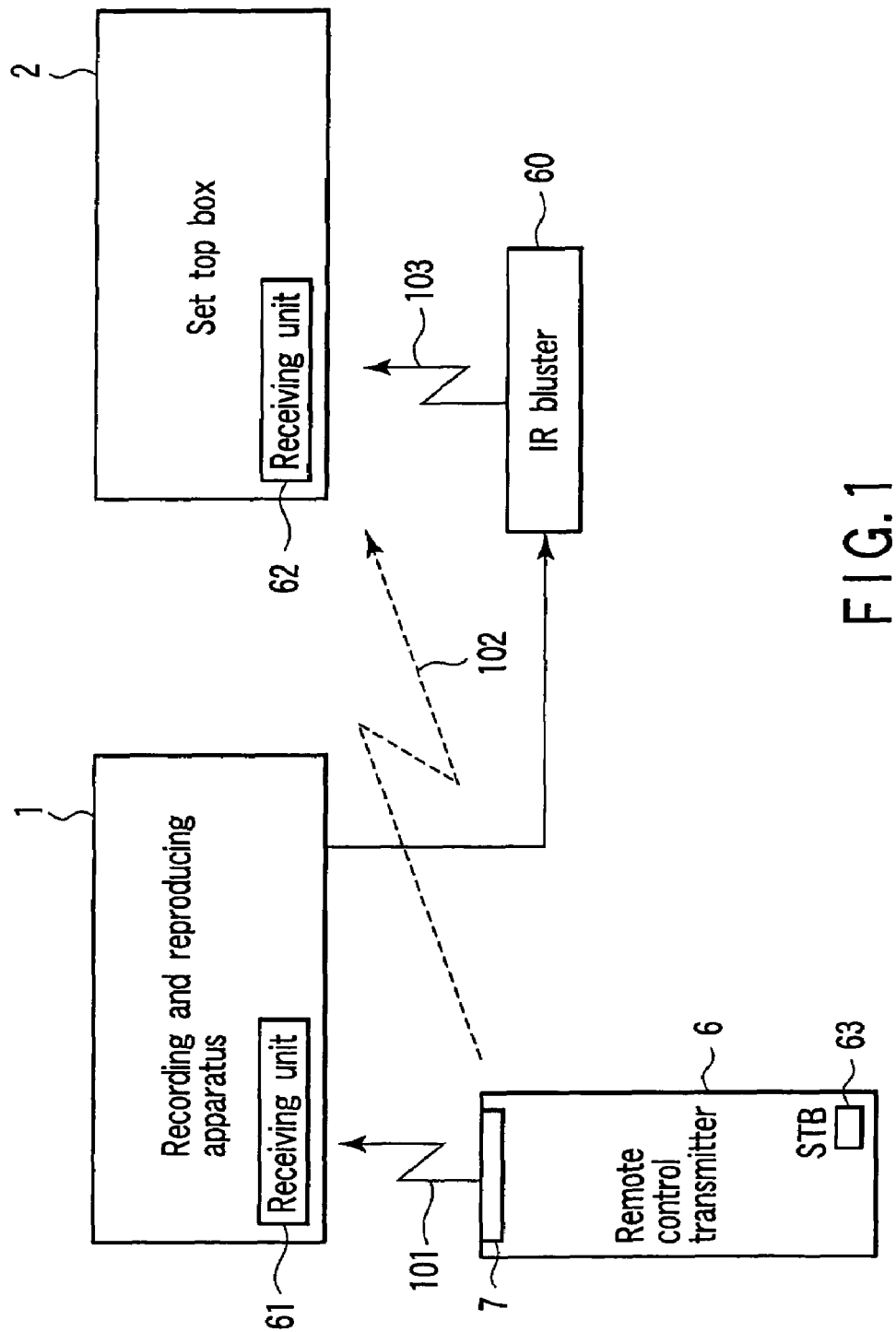
FIG. 1 is a block diagram showing an example of a remote control system according to an embodiment of the present invention.
Figure 2:
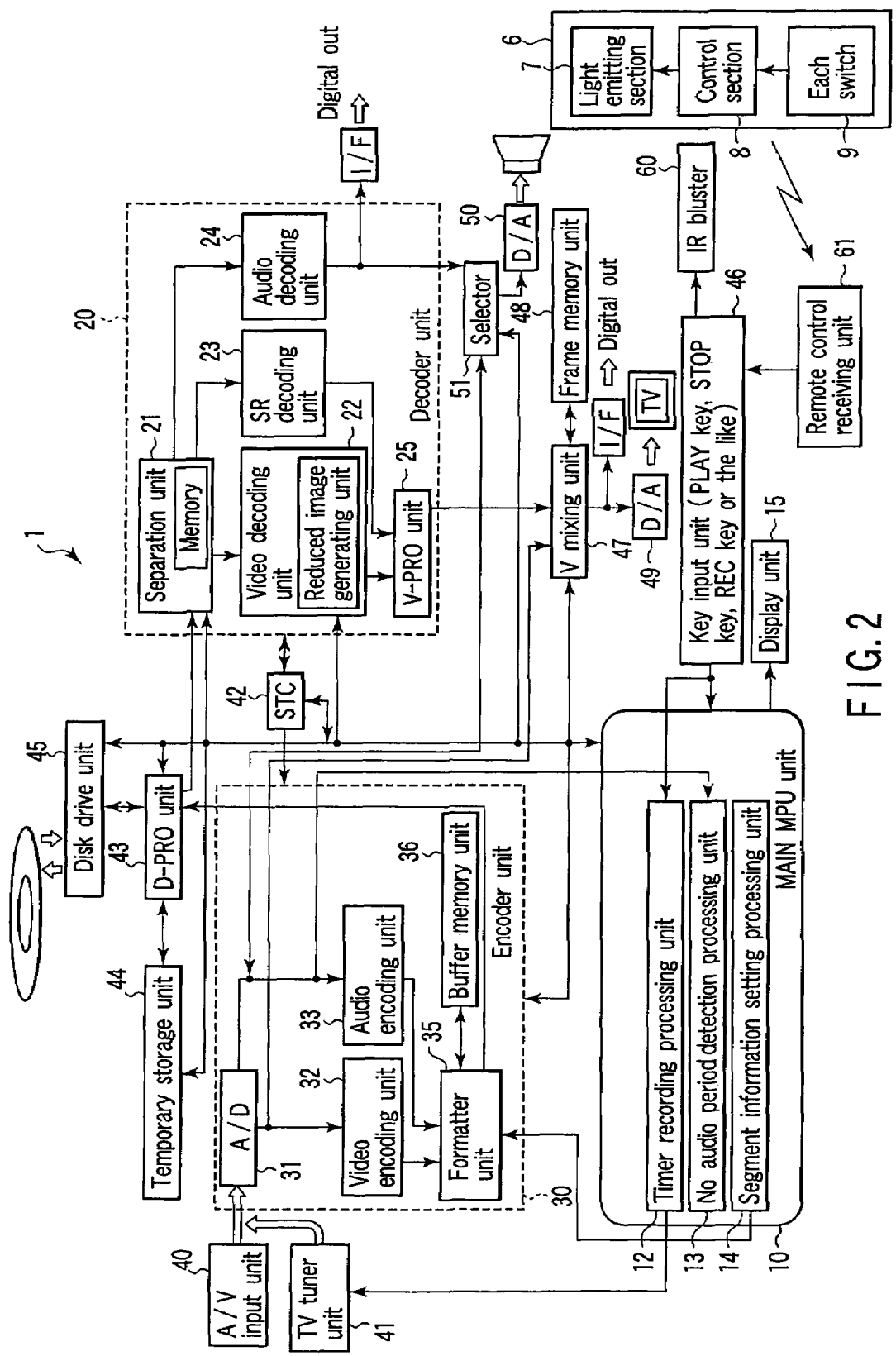
FIG. 2 is a block diagram showing an example of configurations of a recording and reproducing apparatus and the remote control device according to the embodiment of the present invention.
Figure 3:
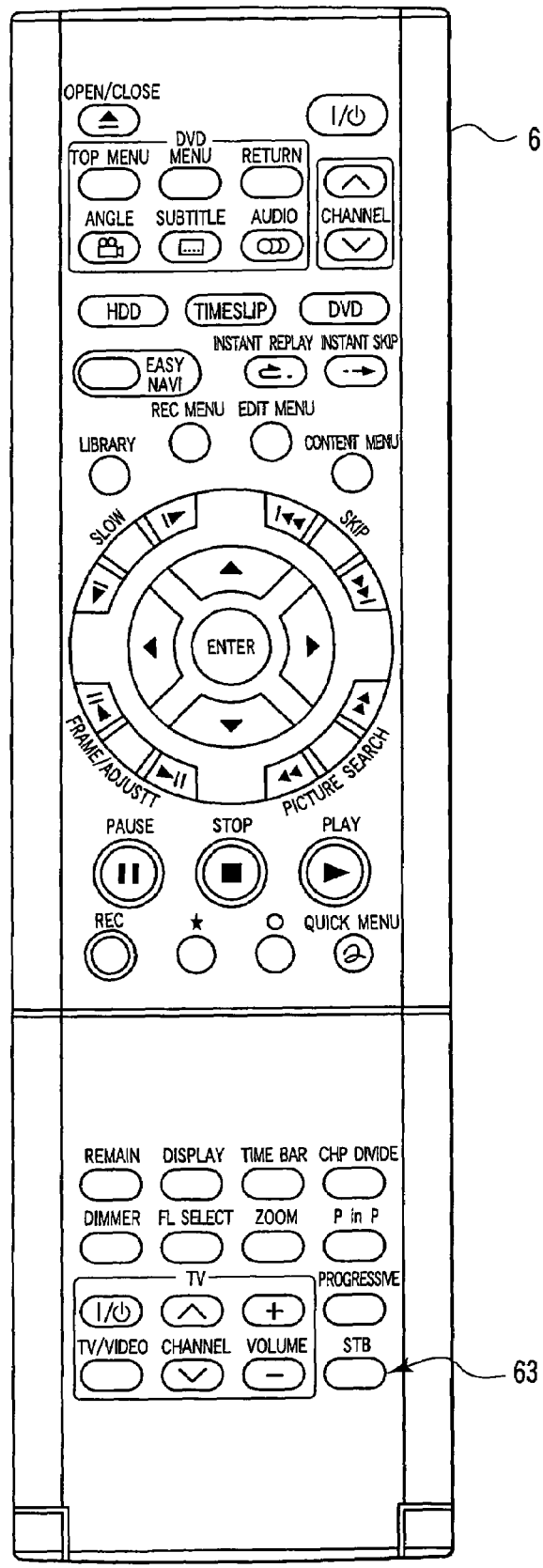
FIG. 3 is a plain view showing an example of the remote control device according to the embodiment of the present invention.

An embodiment according to the present invention is to provide a recording and reproducing apparatus, in which one remote control device controls both of a main body and a peripheral device separately while preparing dedicated operational modes respectively so as to operate them stably, a control method thereof, and a remote control device. FIG. 1 is a block diagram showing an example of a remote control system according to an embodiment of the present invention, FIG. 2 is a block diagram showing an example of configurations of a recording and reproducing apparatus and the remote control device according to the embodiment of the present invention, and FIG. 3 is a plain view showing an example of the remote control device according to the embodiment of the present invention.

<Structure of a Remote Control System According to an Embodiment of the Present Invention>

(System Structure)

At first, in FIG. 1, this remote control system is configured by a recording and reproducing apparatus 1 as a first device, a set top box (hereinafter, referred to as a STB) as a second device, and a remote control device 6 that operates these devices. In this case, any type of the recording and reproducing apparatus 1 is possible, however, for example, a hard disk recorder capable of recording the information in a DVD as shown in FIG. 2 is preferable. As the STB 2, any type of a peripheral device is possible, however, for example, a CS tuner or the like is preferable. Further, to the recording and reproducing apparatus 1, a remote control receiving unit 61 for receiving a control signal from the remote control device 6 and an IR bluster 60 for transmitting the control signal to the STB 2 are connected. In addition, the STB 2 incorporates a remote control receiving unit 62 for receiving the control signal from the recording and reproducing apparatus 1.

(Outline of System Operation)

According to the remote control system having such a structure, the remote control device 6 may transmit the control signal to the remote control receiving unit 61 that is incorporated in the recording and reproducing apparatus 1. This state is paternally indicated by optical communication paths 101, 102, and 103. Then, the recording and reproducing apparatus 1 may receive the signal of the optical communication path 101, may convert it into a control signal capable of controlling the STB 2, and may transmit it to the STB 2. The transmission in this case is shown by the optical communication path 102. The STB 2 may receive the transmitted control signal by the inner remote control receiving unit 62 and may carry out the operation in response to the control signal.

(Structure of the Recording and Reproducing Apparatus and the Operation)

Next, an example of the configuration of the recording and reproducing apparatus according to the embodiment of the present invention will be described in detail with reference to the drawings. As shown in FIG. 2, the recording and reproducing apparatus 1 may reproduce the information such as a program and the contents or the like that are recorded in the DVD or the hard disk, and the DVD or the hard disk may record the program and the contents or the like therein.

As shown in FIG. 2, the recording and reproducing apparatus 1 is provided with an MPU unit 10 to perform the entire control operation, a display unit 15 for displaying the operational information or the like, a decoder unit 20 for decoding the recording information, a encoder unit 30 for coding the information to be recorded, an A/V input unit 40, a TV tuner unit 41, a STC unit (System Time Counter) 42, a D-PRO (Data Processor) unit 43, a temporary storage unit (hereinafter, referred to as an HDD (hard disk drive)) 44, a disk drive unit 45, a key input unit 46, a V mixing unit 47, a frame memory unit 48, a D/A unit for TV 49, a D/A unit for audio 50, and a selector unit 51 or the like.

The MPU unit 10 is provided with a timer recording processing unit 12, a no audio period detection processing unit 13, and a segment information setting processing unit 14 or the like. The timer recording processing unit 12 may record an intended program therein based on the timer recording information that is input from the key input unit 46. The no audio period detection processing unit 13 may detect a no audio period from the intended program (the program to be recorded) based on a no audio period detection condition. The segment information setting processing unit 14 may set the segment information with respect to a predetermined position in the no audio period of the intended program based on a segment information setting condition.

The encoder unit 30 is provided with an A/D unit 31, a video encoding unit 32, an audio encoding unit 33, a formatter unit 35, and a buffer memory 36 or the like. The decoder unit 20 is provided with a separating unit 21, a video decoding unit 22, a SP decoding unit 23, an audio decoding unit 24, and a V-PRO unit 25 or the like.

In addition, the outline of the structure of the remote control device 6 can be represented by a light emitting section 7, a control section 8, and each switch 9. Here, the light emitting section 7 may transmit an optical signal including each key code to be described later, and the control section 8 for performing the entire operation may realize each function to be described later. Further, each switch 9 is described with reference to FIG. 3.

A typical key among respective keys of the remote control device 6 is described below. In other words, an "OPEN/CLOSE" key opens and close a holder of the DVD or the like, a "power switch" key serves to power on the recording and reproducing apparatus 1, a "channel change" key changes a channel of the recording and reproducing apparatus 1, a "HDD" key calls up hard disk, a "DVD" key calls up the DVD, an "EASY NAVI" key performs easy navigation, an "INSTANT REPLAY" key performs easy reproduction, an "INSTANT SKIP" key performs easy skip processing, a "LIBRARY" key calls up a library of the recording information, a "SLOW" key performs slow reproduction, a "SKIP" key performs skip operation, a "FRAME/ADJUST" key performs frame adjustment, a "cursor" key designates an object, an "ENTER" key performs return, a "PAUSE" key performs suspension, a "STOP" key serves to stop, a "PLAY" key serves to reproduce, a "REC" key serves to record, a "QUICK MENU" displays an easy menu, and a "VOLUME" key changes audio.

In addition, as an example of a dual purpose key of the recording and reproducing apparatus 1 and the STB 2, a "channel change" key, the "VOLUME" key, the "cursor" key, and the "ENTER" key or the like are considered. Other keys are dedicated keys for the recording and reproducing apparatus 1. Further, the remote control device 6 has a mode change key 63 for changing a mode from a normal mode to a STB control mode.

In such a configuration, the recording processing of the recording and reproducing apparatus 1 is carried out by the HDD 44 or the disk drive unit 45. For example, the HDD 44 records the same data as the data recorded in a DVD-RAM by the disk drive unit 45 to make the special processing (time shift, writing error processing or the like) that is difficult for the disk drive unit 45 (the disk) independently possible. The HDD 44 is a hard disk drive of 100 GB, for example. Further, by combining this HDD 44 with the DVD-RAM that is a recording destination of the disk drive unit 45, the HDD 44 of a high-capacity HDD 44 is used for recording during a long period of time and the DVD-RAM is used when saving for a long period of time is necessary, and thereby, it is possible to take merits of both in the system.

<Operation by a Remote Controller According to the Embodiment of the Present Invention>

(Operation by Remote Controller and Defect)

The remote control receiving unit 61 and the IR bluster 60 are controlled by a user using the key input unit 46.

The set top box 2 is located in an arbitrary place outside of the recording and reproducing apparatus 1 to be connected to the recording and reproducing apparatus 1 by light with the IR bluster 60 from the recording and reproducing apparatus 1. When using the set top box 2 without using the recording and reproducing apparatus 1, the user may directly operate the set top box 2 or may operate it by the remote control device supplied with the apparatus. When using the recording and reproducing apparatus 1 having an IR bluster function, as a method of controlling the set top box 2 by the user, by operating the recording and reproducing apparatus 1, it is possible to control the set top box 2 via the IR bluster 60 supplied with the recording and reproducing apparatus 1.

If the user presses the above-described dual purpose key when the recording and reproducing apparatus 1 is set at set top box control, the corresponding control signal is transmitted from the remote control device 6 to the recording and reproducing apparatus 1, and the recording and reproducing apparatus 1 transmits a control signal for the set top box to the set top box 2 by the IR bluster 60 after receiving this control signal from the remote control device 6.

In this state, when the user continuously presses the control key of the remote control device 6, if a continuously pressed signal (a continuous code) is transmitted after transmission of the control signal from the remote control device 6, a defect such that timings of the optical communication path 102 of the signal from the recording and reproducing apparatus 1 and the optical communication path 103 of the signal from the IR bluster 60 are overlapped so that the remote control receiving unit 62 of the set top box 2 is saturated occurs, and this causes false operation.

On the contrary, as described in detail below, according to the embodiment of the present invention, even if a STB control mode is provided and the dual purpose key is continuously pressed in this STB control mode, the code of the dual purpose key is transmitted, however, the continuous pressing signal (the continuous code) is not transmitted.

(Processing Operation of the Remote Control Device)

A First Embodiment

Figure 5:
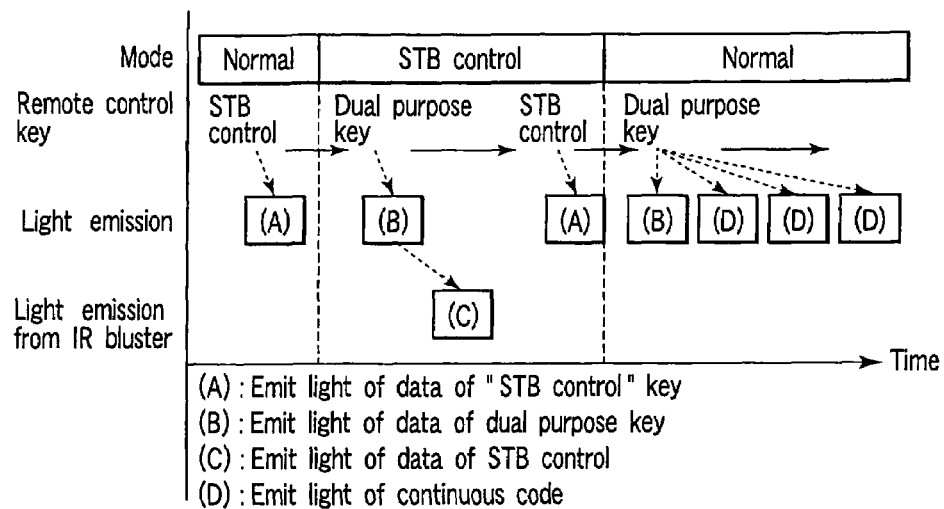
FIG. 5 is a timing chart showing an example of light emission timing of the remote control device according to the embodiment of the present invention.

A first embodiment specifies that the continuous code is not output in the STB control mode. The processing operation of the remote control device as an embodiment of the present invention is described with reference to a flow chart shown in FIG. 4 and a timing chart shown in FIG. 5.

The user presses the STB control key 63 by the remote control device 6 of the recording and reproducing apparatus 1. Thereby, the remote control device 6 is set at the STB control mode (S11) and a signal of the STB control is transmitted from the remote control device 6. When receiving this signal, the recording and reproducing apparatus 1 changes the operational mode from the normal mode into the STB control mode, and hereinafter, without using the dual purpose key for controlling of the recording and reproducing apparatus, the set top box 2 is controlled via the IR bluster 60.

IN this state, if the user presses the dual purpose key (S12, S13, S14), the corresponding key code is transmitted to the recording and reproducing apparatus 1 by the remote control device 6 (S15). When receiving this control signal, the recording and reproducing apparatus 1 transmits it to the set top box 2 as the control signal for the set top box by the IR bluster 60 after receiving it from the remote control device 6.

Also when the user continuously presses the control key of the remote control device 6, the remote control device 6 according to the present invention is set in such a manner that the dual purpose key only transmits the key code without transmitting the continuously pressed signal (S15).

In this sate, if the user presses the STB control key 63 via the remote control device 6 of the recording and reproducing apparatus 1, the remote control device 6 shifts from the STB control mode into the normal mode, and the signal for the STB control is transmitted from the remote control device 6. When receiving this signal, the recording and reproducing apparatus 1 may shift from the STB control mode into the normal mode (S11).

In this normal mode, the dual purpose key is used for control of the recording and reproducing apparatus 1 but is not used for control of the set top box 2 via the IR bluster 60. In this state, since the remote control receiving unit 62 of the set top box 2 is not saturated, if the dual purpose key is pressed (S16), after the control signal is only transmitted (S17), during pressing of the dual purpose key by the user (S18), the continuously pressed signal (a repeat code) is transmitted (S19) so as to certainly transmit the operational information to the recording and reproducing apparatus.

(Processing Operation of the Remote Control Device)

A Second Embodiment

Figure 6:
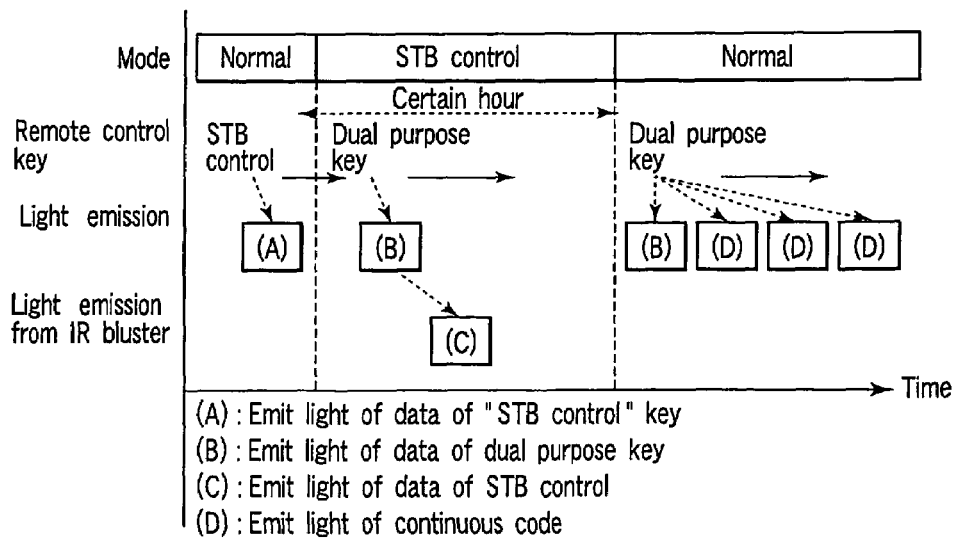
FIG. 6 is a timing chart showing an example of light emission timing of the remote control device according to the embodiment of the present invention.

The second embodiment specifies that the STB control mode returns to a normal mode as certain time has passed. As shown in the timing chart of FIG. 6, according to the first embodiment, the STB control mode is changed by powering on/off of the STB control key 63. However, according to the second embodiment, even if the STB control key 63 is not pressed again after the operational mode shifts to STB control mode, due to working of a timer incorporated in the control section 8, the STB control mode shifts to the normal mode as certain time (for example, 30 seconds) has passed (S13). Thereby, a defect such that the recording and reproducing apparatus 1 that seems more likely to be used cannot be operated well when the user operates the remote controller forgetting that the current mode is the STB control mode is avoided.

(Processing Operation of the Remote Control Device)

A Third Embodiment

Figure 7:
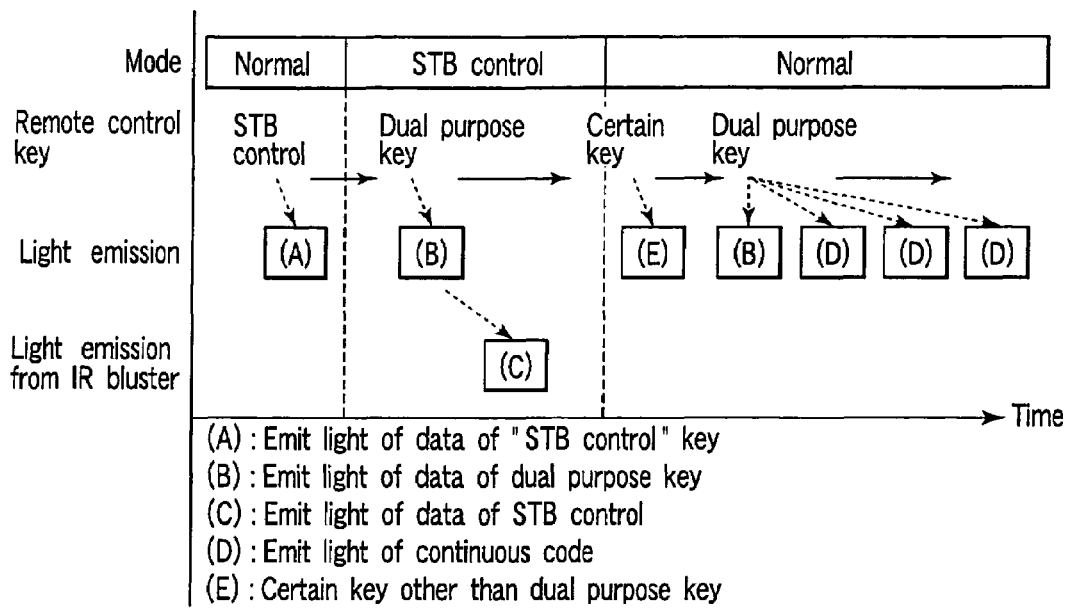
FIG. 7 is a timing chart showing an example of light emission timing of the remote control device according to the embodiment of the present invention.

The third embodiment specifies that the operational mode returns to the normal mode if the key other than the dual purpose key (for example, the dedicated key) is used in the STB control mode. As shown in the timing chart of FIG. 7, when a predetermined key other than the dual purpose key is pressed after the operational mode shifts to the STB control mode due to powering on/off of the STB control key 63, the operational mode shifts from the STB control mode to the normal mode. Thereby, if the user operates the dedicated key in order to operate the recording and reproducing apparatus 1, the operational mode automatically gets out of the STB control mode, so that it is not necessary for the user to carry out the operation for changing the operational mode.

(Processing Operation of the Remote Control Device)

A Fourth Embodiment

Figure 8:
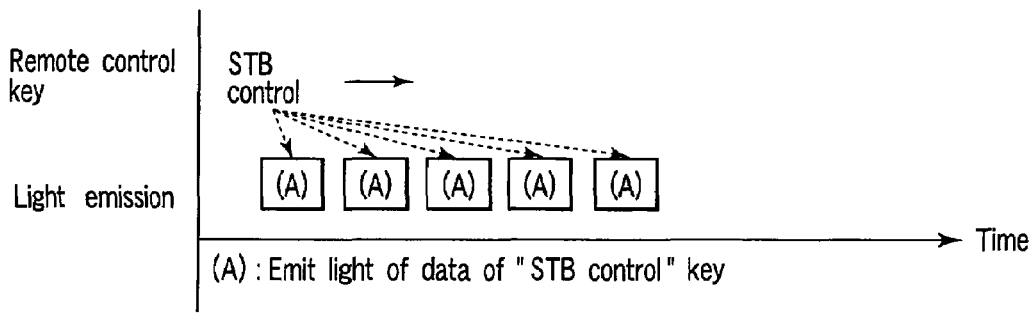
FIG. 8 is a timing chart showing an example of light emission timing of the remote control device according to the embodiment of the present invention.

According to the fourth embodiment, a convenience is further provided when executing the STB control mode. In other words, as shown in the timing chart of FIG. 8, in order to certainly transmit the data of the STB control key 63 to the recording and reproducing apparatus 1, the data of the STB control key 63 is repeatedly transmitted at intervals of certain time and in the certain number of times, and thereby, the mode change operation is certainly processed.

Figure 9:
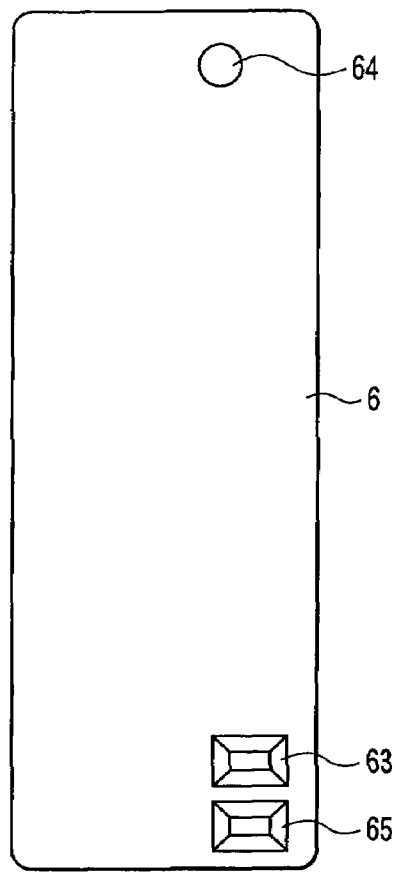
FIG. 9 is a plain view showing an example of other structure of the remote control device according to the embodiment of the present invention.
Figure 10:
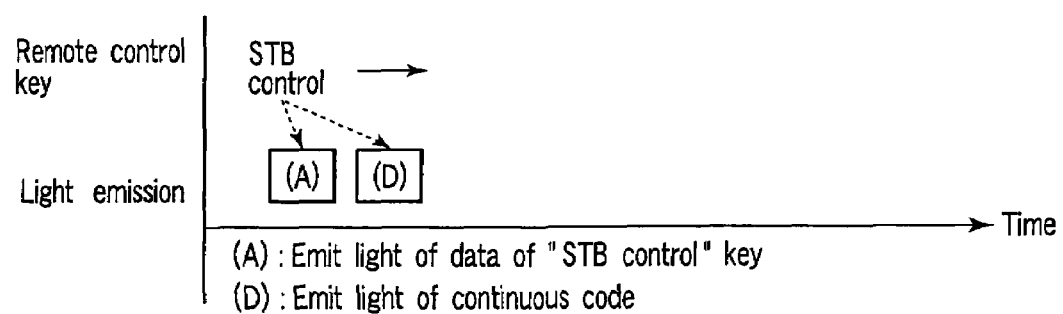
FIG. 10 is a timing chart showing an example of light emission timing of the remote controller to which the present invention is not applied.

In addition, as shown in a plain view of the remote control system of FIG. 9, by further providing a dedicated key 65 for releasing the STB control mode, shift and release of the normal mode and the STB control mode are easily and clearly made. Further, by an LED 64 shown in the plain view of the remote control device of FIG. 9, it is clearly indicated that the current operational mode is the STB control mode. Thereby, making the user to clearly recognize the current operational mode, the false operation is evaded and the reliable operation becomes possible.

As described above in detail, according to the above-described embodiments, a normal mode and a STB (Set Top Box) control mode are provided in one remote controller, and in the STB control mode, the operational key code is transmitted when one operational key (in this case, the dual purpose key that is used for both of the normal operation and the STB operation) is continuously pressed, however, after that, the continuous code is not transmitted. Thereby, in response to the operational key code, the recording and reproducing apparatus may supply a desirable operational key code from the IR bluster to the receiving unit of the set top box.

Further, the operational key code is transmitted from the remote controller only once. Therefor, a conventional defect such that the continuous code has been repeatedly output from the remote controller and the optical signal of this continuous code interferes the receiving unit of the set top box to falsely detect a code is avoided. Thereby, it is possible to certainly control the recording and reproducing apparatus and a STB apparatus, respectively.

In the meantime, since the STP control mode is a control mode having such a special function, it is preferable that a function such that the operational mode shifts to the STB control mode by pressing the STB control mode key and then, the operational mode automatically returns to the normal control mode as certain hour, for example, one minute has been passed is provided. In addition, by pressing the dual purpose key, the operational mode may return from the STB control mode to the normal mode and it is also preferable that a displaying unit for displaying that the operational mode is the STB control mode is newly provided.

According to the above-described various embodiments, a person skilled in the art can realize the present invention, and further, it is easy for a person skilled in the art to make various modifications of these embodiments and to apply the present invention to various embodiments without inventive capability. Accordingly, the present invention covers a wide scope that does not contract a disclosed principle and a new property and is not limited to the above-described embodiments.

What is claimed is:

1. A recording and reproducing apparatus, comprising:
a remote control section having a dedicated key only used in a first mode for the operation of a main body, a dual purpose key used in a second mode for the operation of an outer apparatus and the first mode, a change key which changes a control mode from the first mode to the second mode, a first light emitting section which transmits a code signal in response to the key operation as radiant light, and a control section which controls the light emitting section to transmit a key code of a pressed key and a continuous code meaning continuous pressing when the dedicated key or the dual purpose key is continuously pressed in the first mode and to transmit only the key code of the dual purpose key without the continuous code when the dual purpose key is continuously pressed in the second mode;
a recording and reproducing unit which records and reproduces the information;
a second light emitting unit which transmits a code signal to the outer apparatus as radiant light; and
a main control section which controls the recording and reproducing unit to perform the recording and reproducing processing in response to a received code signal when the code signal is received from the first light emitting section of the remote control section and the first mode is selected based on the received code signal and to supply a predetermined signal to the outer apparatus via the second light emitting unit in response to the code signal from the first light emitting section when the second mode is selected.

2. The recording and reproducing apparatus according to claim 1, wherein the control section automatically changes the control mode to the first mode after certain hour has passed since the control mode shifts to the second mode.

3. The recording and reproducing apparatus according to claim 1, wherein the control section changes the control mode to the first mode when detecting that the key other than the dual purpose key is pressed after the control mode shifts to the second mode.

4. The recording and reproducing apparatus according to claim 1, wherein the remote control section further has a display section which displays that the control section selects the second mode as the control mode.

5. The recording and reproducing apparatus according to claim 1, wherein the control section controls the light emitting section to repeat light emission of the code signal meaning that the control mode is changed from the first mode to the second mode in a certain number of times at intervals of certain hour when detecting that the change key is pressed.

6. The recording and reproducing apparatus according to claim 1, wherein the remote control section further has a second change key to change the control mode from the second mode to the first mode.

7. A control method, when controlling a recording and reproducing apparatus having a recording and reproducing unit which records and reproduces the information and a second light emitting unit which transmits a code signal to the outer apparatus as radiant light, comprising:

using a remote controller having a dedicated key only used in a first mode for the operation of a main body, a dual purpose key that is used in a second mode for the operation of an outer apparatus and the first mode, a change key which changes a control mode from the first mode to the second mode, and a first light emitting section which transmits a code signal in response to the key operation as radiant light, wherein, the remote controller controls the light emitting section so as to transmit a key code of a pressed key and a continuous code meaning continuous pressing when the dedicated key or the dual purpose key is continuously pressed in the first mode and to transmit only the key code of the dual purpose key without the continuous code when the dual purpose key is continuously pressed in the second mode; and when receiving the code signal from the first light emitting section of the remote controller, the recording and reproducing apparatus controls the recording and reproducing unit to perform the recording and reproducing processing in response to the received code signal when the first mode is selected based on the received code signal and to supply a predetermined code signal to the outer apparatus via the second light emitting unit in response to the code signal from the first light emitting section when the second mode is selected.

8. The control method according to claim 7, wherein the remote controller automatically changes the control mode to the first mode after certain hour has passed since the control mode shifts to the second mode.

9. The control method according to claim 7, wherein the remote controller changes the control mode to the first mode when detecting that the key other than the dual purpose key is pressed after the control mode shifts to the second mode.

10. The control method according to claim 7, wherein the remote controller uses a display section which displays that the control section selects the second mode as the control mode.

11. The control method according to claim 7, wherein the remote controller controls the light emitting section to repeat light emission of the code signal meaning that the control mode is changed from the first mode to the second mode in a certain number of times at intervals of certain hour when detecting that the change key is pressed.

12. The control method according to claim 7, wherein the remote controller further uses a second change key to change the control mode from the second mode to the first mode.

13. A remote control device, comprising:
a dedicated key only used in a first mode;
a dual purpose key used in the first mode and a second mode;
a change key which changes a control mode from the first mode to the second mode;
a light emitting section which emits a light of a code in response to pressing of the dedicated key or the dual purpose key; and
a control section which controls the light emitting section to transmit a key code of a pressed key code and a continuous code meaning continuous pressing when the dedicated key or the dual purpose key is continuously pressed in the first mode and to transmit only the key code of the dual purpose key without the continuous code when the dual purpose key is continuously pressed in the second mode.

14. The remote control device according to claim 13, wherein the first mode is a control mode which operates the recording and reproducing apparatus operated receiving a code signal of the remote control device, and the second mode is a control mode which operates a set top box operated receiving a code signal from an IR bluster of the remote control device.

15. The remote control device according to claim 13, wherein the control section automatically changes the control mode to the first mode after certain hour has passed since the control mode shifts to the second mode.

16. The remote control device according to claim 13, wherein the control section changes the control mode to the first mode when detecting that the key other than the dual purpose key is pressed after the control mode shifts to the second mode.

17. The remote control device according to claim 13, further comprising: a display section which displays that the control section selects the second mode as the control mode.

18. The remote control device according to claim 13, wherein the control section controls the light emitting section to repeat light emission of the code meaning that the control mode is changed from the first mode to the second mode in a certain number of times at intervals of certain hour when detecting that the change key is pressed.

19. The remote control device according to claim 13, further comprising: a second change key which changes the control mode from the second mode to the first mode.

* * * * *